(12) United States Patent
Fletcher et al.

(10) Patent No.: US 8,588,970 B2
(45) Date of Patent: Nov. 19, 2013

(54) ROBOTIC SYSTEM WITH DISTRIBUTED INTEGRATED MODULAR AVIONICS ACROSS SYSTEM SEGMENTS

(75) Inventors: Mitchell S. Fletcher, Glendale, AZ (US); Randall H. Black, Phoenix, AZ (US); Andrew J. Michalicek, Phoneix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1111 days.

(21) Appl. No.: 11/581,094

(22) Filed: Oct. 13, 2006

(65) Prior Publication Data

US 2008/0091300 A1    Apr. 17, 2008

(51) Int. Cl.
*G06F 19/00* (2011.01)

(52) U.S. Cl.
USPC ........................................................ 700/245

(58) Field of Classification Search
None
See application file for complete search history.

(56) References Cited

U.S. PATENT DOCUMENTS

| 6,687,571 | B1* | 2/2004 | Byrne et al. | 700/245 |
| 7,290,180 | B2* | 10/2007 | Duron et al. | 714/43 |
| 7,525,997 | B2* | 4/2009 | Benedyk et al. | 370/474 |
| 2004/0210344 | A1* | 10/2004 | Hara et al. | 700/245 |
| 2005/0090935 | A1* | 4/2005 | Sabe et al. | 700/245 |
| 2005/0120275 | A1 | 6/2005 | Fletcher et al. | |
| 2005/0213548 | A1 | 9/2005 | Benson et al. | |
| 2005/0273200 | A1* | 12/2005 | Hietmann et al. | 700/248 |

OTHER PUBLICATIONS

U.S. Appl. No. 11/211,850, Fletcher et al.
U.S. Appl. No. 11/381,021, Arisha, et al.

* cited by examiner

*Primary Examiner* — Khoi Tran
*Assistant Examiner* — Nicholas Kiswanto
(74) *Attorney, Agent, or Firm* — Ingrassia Fisher & Lorenz, P.C.

(57) ABSTRACT

A robotic system includes a plurality of robotic elements, each having at least one processing component, at least one memory component, and an I/O interface; and a virtual backplane coupling the plurality of robotic elements.

15 Claims, 4 Drawing Sheets

ROBOTIC SYSTEM WITH DISTRIBUTED INTEGRATED MODULAR AVIONICS ACROSS SYSTEM SEGMENTS

FIELD OF THE INVENTION

The present invention generally relates to a robotic system, and more particularly relates to a robotic system with distributed integrated modular avionics across system segments.

BACKGROUND OF THE INVENTION

NASA initiatives for space exploration include the development of programs such as the Space Exploration Vision and Project Constellation programs. Aspects of these programs include lunar or extra-planetary base concepts and operations, including precursor missions to the Moon and Mars. Achieving the initiatives of NASA will require significant support from robotic systems with such varied functions as rendezvous and docking, in-space assembly, in situ mining and refining, and mobile astronaut assistants.

Conventional robotic systems can include dozens or hundreds of robots operating simultaneously. A team of several individuals can be required for each robot. For example, the Mars Exploration Rovers require a staff of approximately 70 people to support continual operation of a single robotic rover. While this has been sufficient for prior robotic missions, economic realities and increasing levels of system complexities render this approach difficult. Increased autonomy, with the attendant decrease in required operator interaction, can provide advantages. However, increased autonomy can increase financial and time costs because the robots must be individually designed for a specific mission. Moreover, increased autonomy tends to decrease the reliability of the system, as well as increase the risk of mission failure, equipment damage, and human injury.

Accordingly, it is desirable to provide an improved robotics system that can be implemented at a lower cost and require less human interaction. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A robotic system comprises a plurality of robotic elements, each having at least one processing component, at least one memory component, and an I/O interface; and a virtual backplane coupling the plurality of robotic elements.

A method is provided for completing a function with a robotic system comprising a plurality of robotic elements. The method includes gathering data with at least one sensor provided on a first robotic element of the plurality of robotic elements; processing the data with at least one processing element provided on a second robotic element of the plurality of robotic elements; and performing the function with at least one effector provided on a third robotic element of the plurality of robotic elements based on the processed data.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
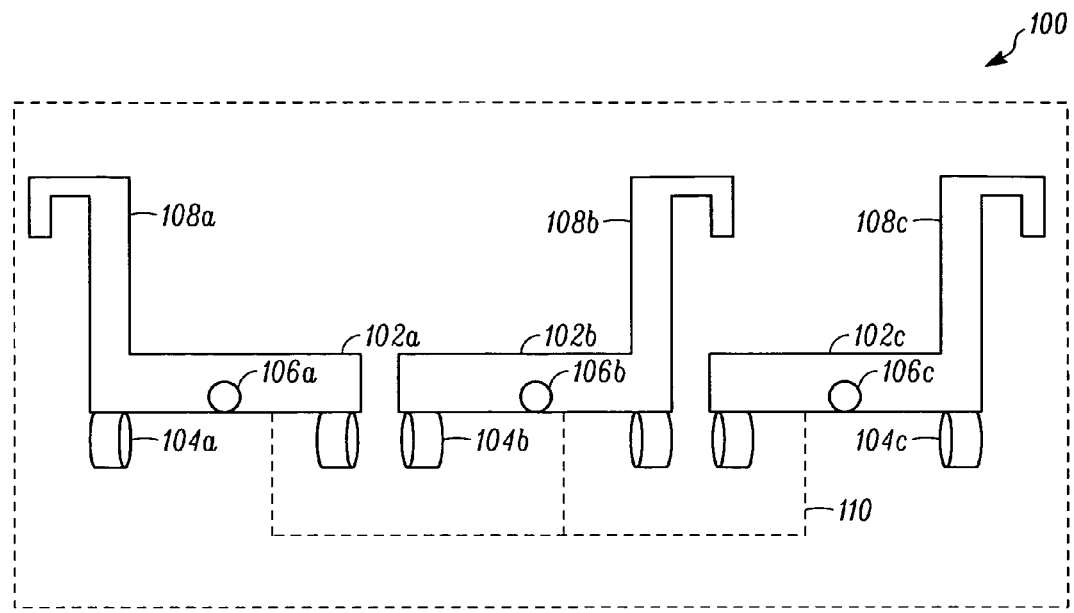
FIG. 1 is a schematic representation of a robotic system in accordance with one embodiment of the present invention.

Referring initially to FIG. 1, a robotic system 100 in accordance with the present invention can include one or more robots 102a, 102b, 102c. The robots 102a-c can include one or more effectors 104a, 104b, 104c, 108a, 108b, 108c and one or more sensors 106a, 106b, 106c. The effectors 104a-c, 108a-c can include actuators for controlling the robots 102a-c, such as wheel drives 104a-c, and actuators for performing a designated mission function, such as arm 108a-c. Other types of effectors 104a-c, 108a-c can include sensor actuators, grappling devices, docking mechanisms, soil and environment manipulators, astronaut assistance, antenna pointing systems, motor drives, thrusters, momentum control devices such as reaction wheels and control moment gyroscopes, solenoids, power control, and similar components. The types of sensors 106a-c can include guidance, navigation and control sensors and/or mission specific sensors. Other types of sensors 106a-c include cameras, sonar, radar, lidar, pressure, temperature, accelerometers, inertial measurement units, ring laser gyroscopes, strain gages, chemical composition detectors, spectrographs, imaging, radiation detectors, proximity detectors, soil analyzers, and similar sensors. The robots 102a-c can be coupled together wirelessly with a virtual backplane 110, which is discussed in greater detail below.

Figure 2:
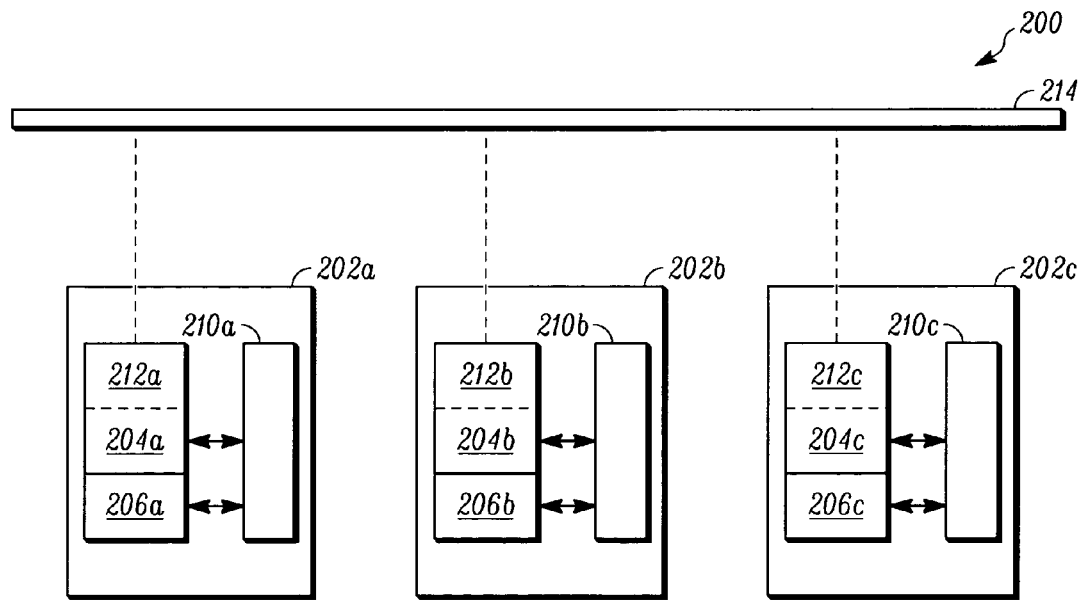
FIG. 2 is a schematic representation of hardware components of a robotic system in accordance with one embodiment of the present invention.

FIG. 2 illustrates another view of an exemplary embodiment of a robotic system 200 in accordance with the present invention. The robotic system 200 includes one or more robotic elements 202a, 202b, 202c. Each robot 102a-c, shown in FIG. 1, can include one or more robotic elements 202a-c.

Each robotic element 202a-c can include one or more hardware components, such as a processing component 204a, 204b, 204c; one or more I/O components 206a, 206b, 206c; and one or more physical backplanes 210a, 210b, 210c. The processing components 204a-c can include one or more communication interfaces 212a, 212b, 212c. The I/O components 206a-c can receive and provide inputs to and from sensors and effectors, such as sensors 106a-c and effectors 104a-c, 108a-c of the robots 102a-c of FIG. 1. The processing components 204a-c control the flow of data to and from the I/O components 206a-c and are discussed in further detail below. The physical backplanes 210a-c can be used to connect the respective processing components 204a-c and I/O components 206a-c. The physical backplanes 210a-c can be any type, including point to point, cPCI, VME, IDE, FSB, serial PCI, and the like. Other components can also be provided. The processing components 204a-c, I/O components 206a-c, and communication interfaces 212a-c can be modular to simplify the robotic system implementation and to reduce manufacturing and repair costs.

Each robotic element 202a-c can be coupled to the other robotic elements 202a-c by a virtual backplane 214. The virtual backplane 214 represents the virtual communications interface between the robotic elements 202a-c, particularly the virtual communications interfaces between individual communications interfaces 212a-c and the physical backplanes 210a-c. The virtual backplane 214 can include a high-speed data bus or wireless data bus and enable all the data of the system 200 to be available to each of the robotic elements 202a-c, regardless of the origin or physical location of the data. This allows the robotic elements 202a-c to be independent of the software application of the entire robotic system 200, thus allowing a more simplistic implementation. The virtual backplane 214 additionally enables the system 200 to implement the modular architecture across many robotic elements 202a-c. The virtual backplane 214 and the resulting accessibility of all data to all robotic elements 202a-c enables the robotic elements 202a-c to be optimally sized to reduce weight and to allow local thermal issues to be considered in the architectural implementation. Additional robotic elements can be added for extended availability, increased redundancy, and/or increased processing and I/O capabilities. Embodiments and further features of the virtual backplane 214 are described in further detail below in reference to the subsequent FIGS.

The virtual backplane 214 can be a deterministic wireless virtual backplane. As noted above, the interface 212a-c for the respective robotic element 202a-c can access any data within the system 200. Any data that is transferred within the system 200, either within a robotic element 202a-c or between robotic elements 202a-c, is placed on the virtual backplane 214. The interface 212a-c can determine whether the data is applicable to the respective robotic element 202a-c, and read and store only that data on the robotic element 202a-c. In an alternate embodiment, the virtual backplane 214 can place all data in all robotic elements 202a-c.

Figure 3:
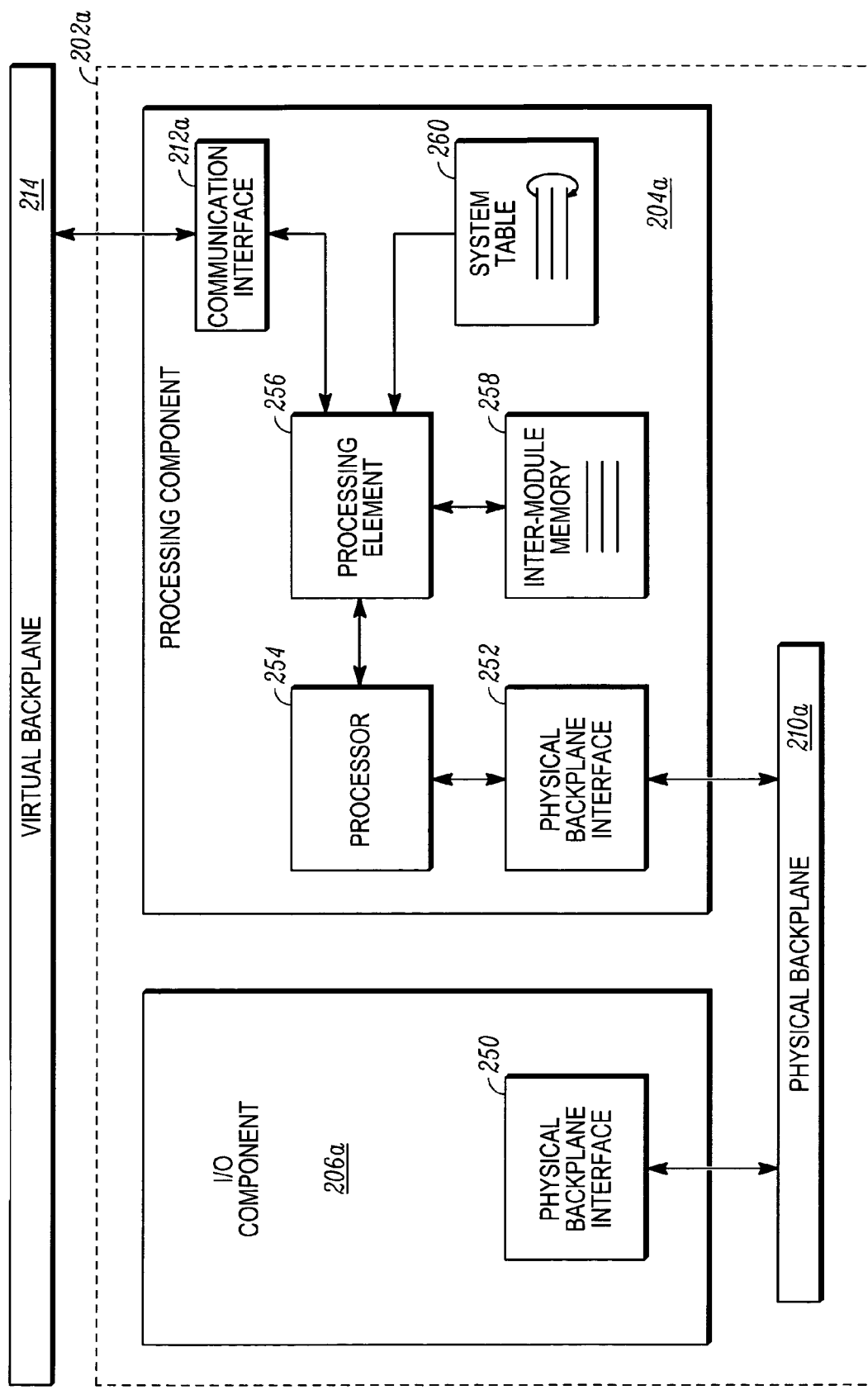
FIG. 3 is a more detailed representation of a portion of the hardware components shown in FIG. 2.

FIG. 3 illustrates a more detailed view of a portion of the robotic element 202a shown in FIG. 2. Both the I/O component 206a and the processing component 204a include a physical backplane interface 250, 252 to communicate with the physical backplane 210a, and thus, the other components of the robotic element 202a. The processing component 204a can include a processor 254 coupled to the physical backplane interface 252 and a processing element 256. Data is transferred to and from the I/O component 206a under control of the processor 254 through the physical backplane 210a.

The processing element 256 is coupled to the communication interface 212a, inter-module memory 258, and one or more system tables 260. The processing element 256 controls the system tables 260 outside the processor 254. In an alternative embodiment, the processing element 256 is part of the processor 254.

The communication interface 212a can be coupled to the virtual backplane 214, for example, with AFDX, SAE 1394, or similar interfaces. The communication interface 212a can place data from the robotic element 202a on the virtual backplane 214 and/or retrieve data from the virtual backplane 214 at a time specified in the system table 260. The processing element 256 controls the transfer of data to and from the inter-module memory 258 and from the inter-module memory 258 to the processor 254, such as memory mapped processor memory included in the processor 254. In addition, processing element 256 can create interrupts within the processor 254 to define time partitioning.

Figure 4:
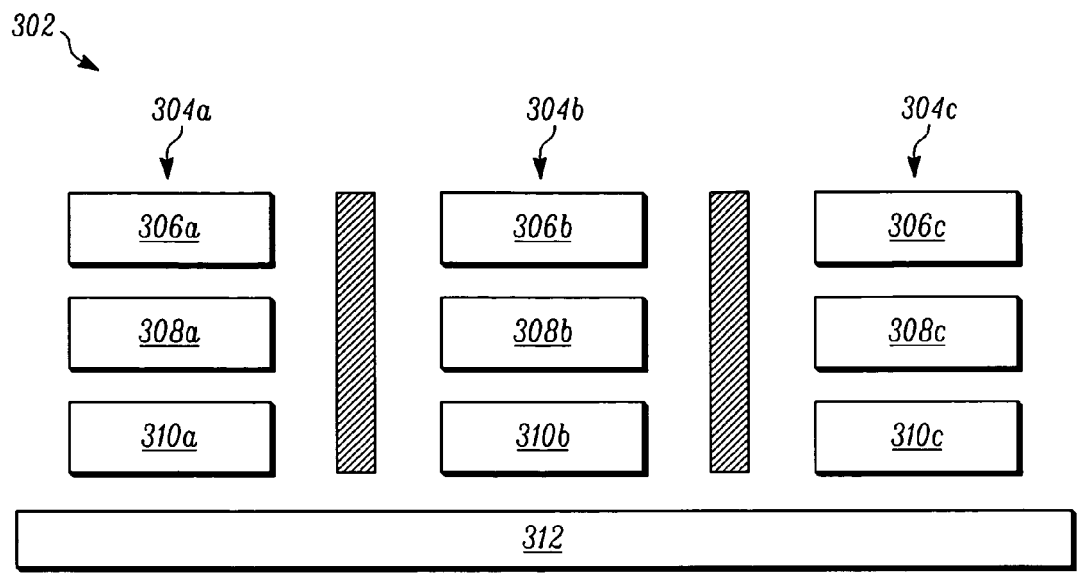
FIG. 4 is a schematic representation a robotic element of a robotic system in accordance with one embodiment of the present invention.

FIG. 4 illustrates an alternate view of one embodiment which describes one example of how the software can be organized to maximize the effectiveness of the hardware components of FIGS. 2 and 3. FIG. 4 further illustrates an exemplary software embodiment of the system that includes a single or multitude of hardware and software components within robotic element 302 that is subdivided into three or more software partitions 304a, 304b, 304c, although a greater or fewer number of software partitions can be provided. The software partitions 304a-c communicate with each other and are effectively connected by a virtual backplane 312, which can correspond to the virtual backplanes 110, 214 of FIGS. 1 and 2. As such, to the entire robotic system, the partitions 304a-c can appear to be separate computing elements, such as individual virtual computers. Each partition 304a-c can execute programs to provide different functionalities within the system. Each partition 304a-c can include a memory subcomponent 308a, 308b, 308c; a processing subcomponent 306a, 306b, 306c; and an I/O subcomponent 310a, 310b, 310c. Each processing subcomponent 306a-c is operable to indicate what data the I/O subcomponent 310a-c should place on the virtual backplane 312, when to place the data on to the virtual backplane 312, and the rate to place the data on the virtual backplane 312. In addition, each processing subcomponent 306a-c is operable to instruct the I/O subcomponents 310a-c when to retrieve data from the virtual backplane and what data to retrieve.

Memory subcomponents 308a-c store data and program files that are executed using the processing subcomponents 306a-c. Memory subcomponents 308a-c are preferably a readable/writable memory that can be updated as needed. In one embodiment of the present invention, multiple applications can be stored in the memory subcomponents 308a-c.

The memory subcomponents 308a-c can include system memory and scratchpad memory. System memory can include configuration or system tables, such as system tables 260 discussed above with reference to FIG. 3. The system tables, in one embodiment, contain information concerning the programs and the sequence of events the programs are to be executed by the processing subcomponent 306a-c and what data is to be presented to and from the virtual backplane 312. In addition, the system tables can contain information as to what data needs to be placed or retrieved from the virtual backplane 312, when to place or retrieve the data and the rate that the data are to be placed or retrieved. The applications running on the partitions 304a-c use the system tables to determine the data retrieval and placement information.

In addition to including system tables, system memory can comprise a multiplicity of toggle memory. Toggle memory associates each of the tables with the occurrence of specific events. For example, a robotic element 302 may be associated with one task until a certain amount of time has passed. When the time elapses or a predetermined event occurs, toggle memory can be used to determine a new system table to use. The new system table could then change what the robotic element 302 was doing, such as by starting a new application and changing the information flow on the virtual backplane 312. The new system table can also change the data retrieved from and sent to the virtual backplane 312. In this exemplary embodiment, the use of system tables allows data to be provided or sent in a predetermined, deterministic manner.

In one exemplary embodiment of the present invention, an event that can cause a change of the system tables can include a change in the number of partitions 304a-c. The change in the number of partitions 304a-c can include the failure or loss of a partition 304a-c. If a partition 304a-c malfunctions, a new system table can be used that instructs another partition 304a-c to take over for the failed partition 304a-c.

In another exemplary embodiment of the present invention, an event that can cause a change of the system tables can include a change in software functionality. A change in software functionality can include the loss of software functionality or the addition of software functionality.

In one exemplary embodiment of the present invention, additional system tables or changes to the system tables can be provided as needed, for example, by the operator. For example, if an event is anticipated that does not have a system table, an appropriate system table can be generated by off-line tools in the same manor as prior system tables. In one exemplary embodiment, the system table can then be uploaded into system 300. For example, if the system 300 is deployed in a spacecraft, ground control could provide new system tables.

The partition 304a-c allocation can be predetermined by operational tools and based upon the computational requirements of the partition 304a-c. A clock interrupt scheme of a host processing module can be used to enable an operating system or middleware to perform a context switch from one partition 304a-c to the next according to the predefined schedule. Thus, a partition 304a-c is guaranteed sufficient computing resources based upon the execution frame rate requirement of the partition 304a-c. The order of execution between partitions 304a-c can be consistent within each execution frame. In one embodiment, the allocation of processing in partitions 304a-c is predetermined and established by time partitioning, such as described in ARINC 653.

In the I/O component 310a-c access and backplane access domains, data flow is likewise identified by the application developer and controlled by the underlying hardware and software infrastructure. The movement of data in and out of the partitions 304a-c, as well as communication between the partitions 304a-c is predetermined by operational tools, and based upon the needs of the various partitions 304a-c. In one embodiment, the movement of data in and out of the partitions 304a-c is predetermined and established by space partitioning, such as described in ARINC 653.

Figure 5:
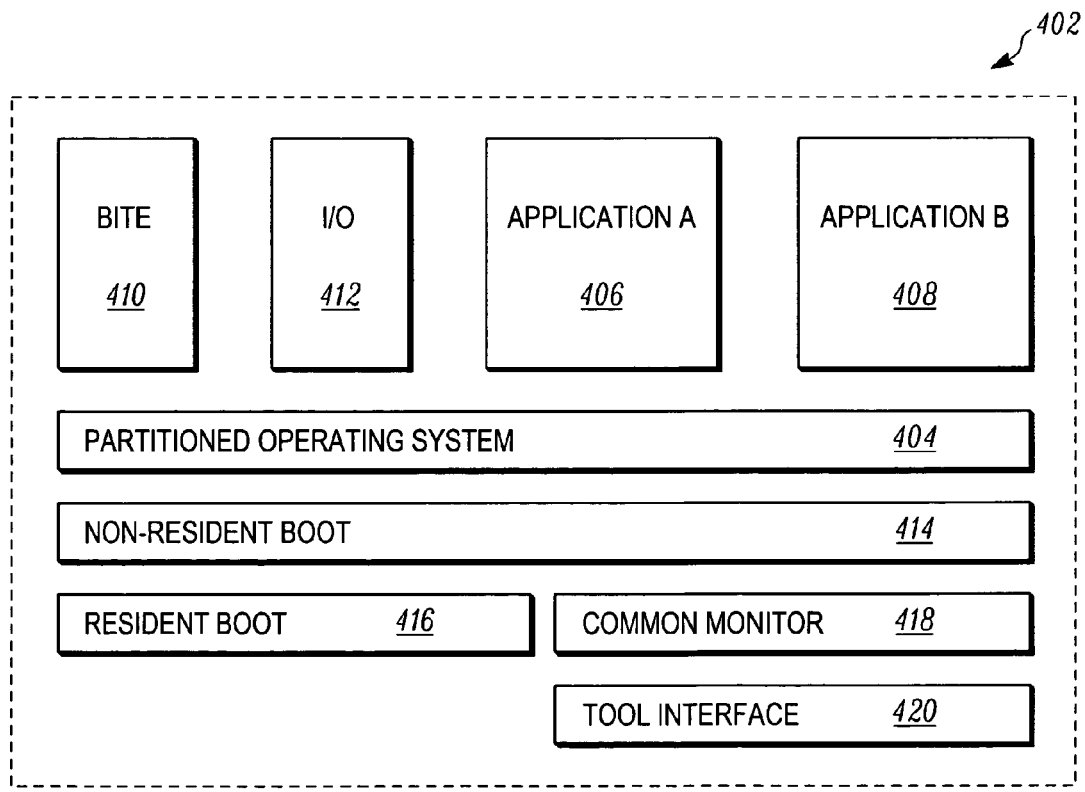
FIG. 5 is a schematic representation of the software infrastructure of a robotic element of a robotic system in accordance with one embodiment of the present invention.

FIG. 5 illustrates a more detailed embodiment of the software execution of the system that includes one or more robotic elements 402, and particularly illustrates the software infrastructure of the robotic element 402. The robotic element 402 can correspond to robotic element 302 of FIG. 4, which illustrates software partitioning and robotic elements 202a-c in FIGS. 2 and 3, which illustrates hardware components.

The robotic element 402 includes a partitioned operating system 404. The operating system 404 can include an OS Application Programming Interface (API), memory management, application fault response protocols, and time management features. The robotic element 402 can further include one or more applications 406, 408, which are labeled Application A 406 and Application B 408 in FIG. 4. The applications 406, 408 can correspond to the partitions 304a-c in FIG. 3, or the partitions 304a-c can run more than one application 406, 408. In one embodiment, the operating system 404 can adhere to the protocol defined in ARINC-653 (Avionics Application Standard Software Interface) or other partitioned operating systems such as the Honeywell DEOS®. The operating system 404 can allocate a pre-defined set of memory resources for each application 406, 408. A hardware-based Memory Management Unit (MMU) can enforce access rights to the memory resources to ensure that the memory resources of the applications 406, 408, including stack and scratch areas, are protected from access by other applications 406, 408, and that software and/or memory failures do not propagate to other partitions running on the same robotic element 402. Temporary storage locations such as program registers can be automatically stored by the software infrastructure when a context switch occurs. Each application 406, 408 can perform the typical functions associated with complex applications, such as interaction between multiple processes, threading, and executing processes at differing cyclic rates.

Other partitions of the robotic element 402 can include built-in test equipment (BITE) component 410, an I/O partition 412. The BITE component 410 can include functions for continuous BITE, status generation, maintenance interface, and fault server, as well as an OS API to interact with the operating system 404. The I/O partition 412 can include an IEEE 1394 interface, an MIL-STD 1553 interface, an Ethernet interface, analog I/O, discrete I/O, and/or a RS-422 interfaces well as an OS API to interact with the operating system 404. The I/O partition 412 may house all of the I/O drivers and assures that the I/O data is moved to and from partitions according to pre-defined table entries. Alternately, I/O partition 412 may be implemented by a plurality of partitions.

One skilled in the art of electronic systems that contain computing elements will recognize that other infrastructure components of the robotic element 402 can include a non-resident boot component 414, a resident boot component 416, a common monitor component 418, and a tools interface component 420. The non-resident boot component 414 can include a hardware abstraction layer (HAL-2), non-resident boot initialization, power-up boot (POST), phantom fault response, software loader, platform load verification, module load verification, and cabinet initialization. The resident boot component 416 can include boot initialization, and a hardware abstraction layer (HAL-1). The common monitor component 418 can include a system monitor and/or a debug interface. The tools interface component 420 can include a partition monitor and/or a debug interface.

The applications 406, 408 within the robotic element 402 can be seamless. In the preferred embodiment, in highly reliable systems no application can contaminate the code, I/O, or data storage areas of another application; consume the shared processor resources to the exclusion of any other application; consume I/O resources to the exclusion of any other application; or cause adverse affects to any other application as a result of a hardware or software failure unique to that partition.

The architecture of the robotic element 402 can enhance the overall processing platform reliability. A fault in an individual hardware element affects only the application 406, 408 associated with that element. A hardware failure does not necessarily disable an entire robotic element. An application 406, 408 running on a single processor can be modified without requiring re-certification of other applications 406, 408 running on the same processor. Thus, applications 406, 408 that are subject to frequent modifications may be co-resident with relatively stable partitions without requiring superfluous reverifications. Likewise, applications 406, 408 with mixed criticality levels may be co-resident without requiring all partitions to be certified to the highest criticality level.

Associated with the modular nature of the architecture, a layered approach to the hardware and software of system 400 can minimize the effect of system changes on user applications to provide a continuous spectrum of support ranging from direct interfaces between hardware components to application program interfaces accessed directly by user applications. Layering the architecture can simplify the impact of the future modifications or upgrades inevitably associated with human space applications and long life systems. The impacts of hardware changes due to obsolescence are typically dealt with at the hardware interface or middleware layers, while applications are often unaffected by these changes.

The system 400 can utilize a coordinated system of development tools to implement the modular, partitioned architecture. The development tool can implement a subdivision of processor and memory resources, interactions between partitions, coordination of I/O operations and execution times and other aspects.

Figure 6:
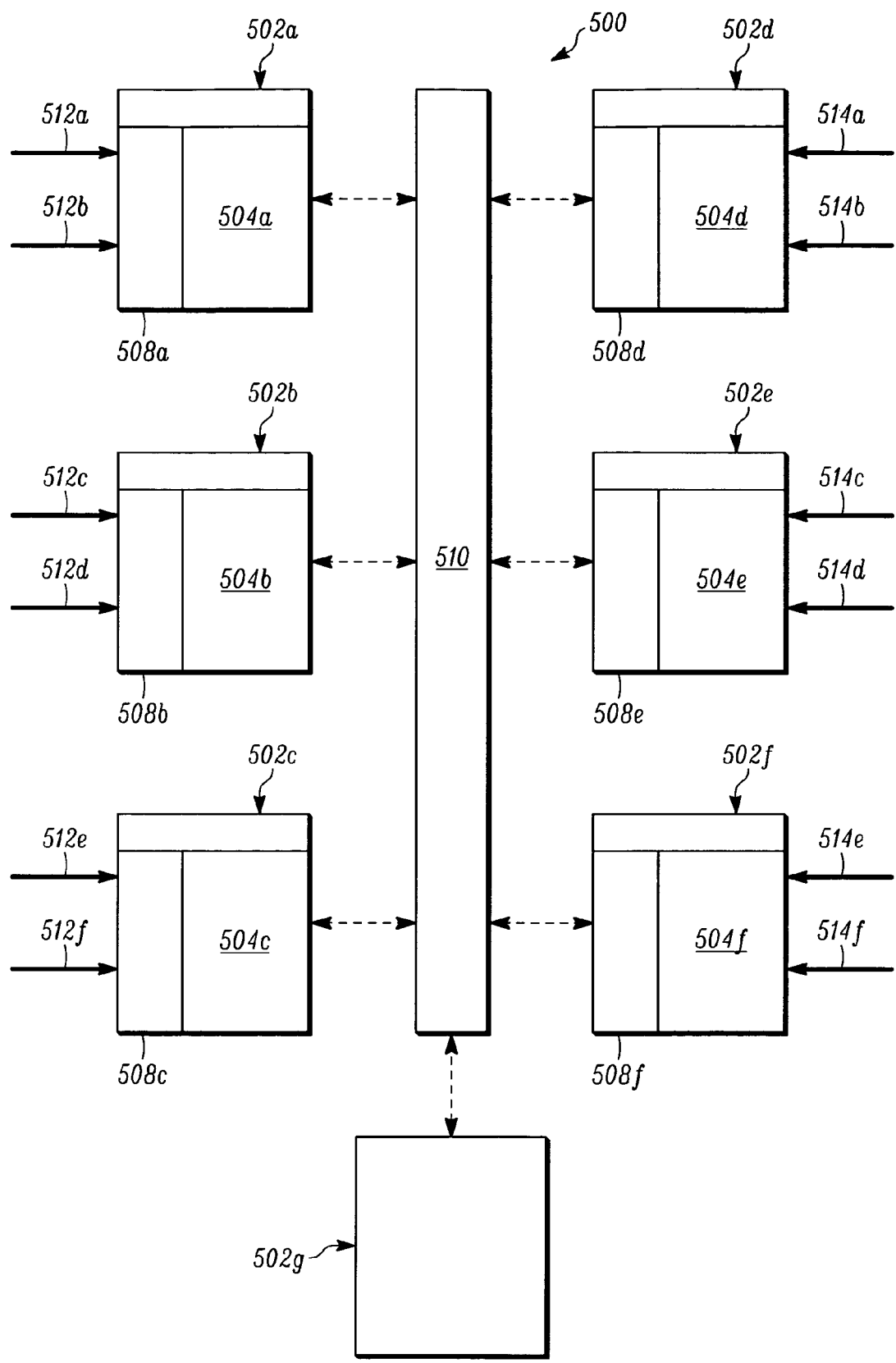
FIG. 6 is a schematic representation a data flow a robotic system in accordance with one embodiment of the present invention.

FIG. 6 illustrates another view of an exemplary embodiment of the system 500 having a plurality of robotic elements 502a, 502b, 502c associated with sensor function and plurality of robotic elements 502d, 502e, 502f associated with effector function. As in FIG. 2, the robotic elements 502a-f can be connected by a virtual backplane 510. FIG. 5 particularly illustrates the data flow of the system 500. Arrows 512a, 512b, 512c, 512d, 512e, 512f represent data from the sensors of the system 500. The sensor data 512a-f is gathered by the robotic elements 502a-f, and provided to the virtual backplane 510. The system 500 provides commands for the effectors, represented by arrows 514a, 514b, 514c, 514d, 514e, 514f. The system can also include a control robotic element 502g, which may or may not have sensors and effectors.

Each robotic element 502a-c, 502d-f can include a processor 504a, 504b, 504c, 504d, 504e, 504f that respectively controls the functions of the sensors and effectors onboard the robotic element 502a-c, 502d-f. Each robotic element 502a-f can further include an I/O interface 508a, 508b, 508c, 508d, 508e, 508f and an memory component 506a, 506b, 506c, 506d, 506e, 506f.

As in FIGS. 4 and 5, each robotic element 502a-g can include one or more partitions or applications, and the correlated activities of the overall robotic system 500 can be controlled by a single application running in a partition on one of the robotic elements 502a-f, while the remaining robotic elements 502a-g would each have their separate I/O partitions controlling the low-level functions of the onboard sensors and effectors.

Alternatively, the centralized computing engine can broken up into any number of distributed robotic elements 502a-g, and the I/O interface to the sensors and effectors is distributed into each robotic element 502a-g within the system 500. Any of the elements required for processing the sensor data 512a-f and providing the effector commands 514a-f can be provided by any partition within the system 500. Using processes and tools, static system tables can be generated that identify the assignment of applications to computing engines, the processor and memory resources assigned to each application, and the data movement between applications. The underlying hardware/software infrastructure controls system operations and data movement between applications using these tables. Each robotic element 502a-g can implement a fault containment zone which would hold as a minimum a partition that contains the I/O control of the onboard sensors and effectors for that robotic element 502a-g.

In one embodiment, human safety within the robotic system 500 can be considered. Each robotic element 502a-g can be fail-passive, which can be provided by lock-step processing, polynomial progression encoding, and/or triple modular redundancy. A safety partition can enforce a set of rules designed to protect the astronaut prior to those commands 514a-f being sent to the robot effectors.

In one embodiment of the robotic system 500 of the present invention, redundancy can be provided. In one embodiment, spare robotic elements 502a-g can be configured to replace any of the robotic elements 502a-g. An alternate embodiment includes redundant elements 502a-f that only operate when their primary element 502a-g fails.

Functional switching capability can be provided within the integrated modular avionics architecture to allow each robotic element 502a-g to have multiple capabilities within the partitioned software, activating only those capabilities and interactions that are appropriate to a given configuration. Alternate possible configurations based on mission or robotic element 502a-g availability can be stored in the robotic element 502a-g. Changes in mission scenarios, failures in existing robotic elements 502a-g, or operator command would drive a switchover from one set of onboard controlling tables, to an appropriate alternate set of tables. This allows a robotic element 502a-g to be reconfigured to operate according to predetermined characteristics, such as another robotic element 502a-g failing, prior to being placed in service.

In addition, data transmitted by the wireless virtual backplane 510 can be redundant in nature. In an integrated modular avionics redundancy scheme, if a first robotic element, e.g., 502a, sends data to the system over the virtual backplane 510 and the secondary robotic element, e.g., 502b, determines that the primary robotic element 502a did not transmit data in the pre-assigned number of bits, the secondary robotic element 502b will then place the entire frame contents on the virtual backplane 510. Each of the robotic elements 502a-f of the robotic system 500 would notice that data was not received in the initial time slot, and wait for the secondary robotic element 502b to transmit the data. In at least one embodiment, the time between the primary robotic element 502a not sending data and the secondary robotic element 502b sending data is as little as seven microseconds. This redundancy scheme is transparent at the execution level and is sufficient to meet the safety requirements for interaction with astronauts.

The virtual backplane 510 can include a deterministic wireless communication scheme, such as a Time Division Multiple Access (TDMA) at the Media Access Control layer of wireless protocols, such as the Zigbee (802.15.4) protocol and 802.11 protocol.

As noted above, the hardware and software of the system 500 can be modular to reduce manufacturing and repair costs. The modular software approach can provide a reduction in logistics such as training, spares, repair, and upgrades. Additional development benefits are realized through decreased built-in test software needs, reduced board support package development, fewer required unique data loaders, etc.

The system 500 according to one embodiment can realize the improved safety requirements while additionally lowering their cost of operation for the NASA space exploration vision. The system 500 is expandable and/or re-configurable in the future and meets the human ratings safety requirements, avionics performance requirements, reduced human control requirements, and lower lifecycle cost of implementation and execution.

Exemplary embodiments of the present invention enable a single operator, or a group of operators, to control a plurality of robots, including a fleet of robots, as a single system. The robots can be controlled and communicate with the operator and one another via a virtual backplane in which each robotic element or partition acts as a virtual computer that collectively forms the overall system.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A robotic system comprising:
   a plurality of robotic elements, each having at least one processing component, at least one memory component, and an I/O interface residing in each of the robotic elements; and
   a virtual backplane coupling the plurality of robotic elements, wherein each of the plurality of robotic elements includes system tables saved in the at least one memory component to control data transfers to and from the plurality of robotic elements and the virtual backplane.

2. The robotic system of claim 1, wherein at least some of the plurality of robotic elements include sensors, and at least some of the plurality of robotic elements include effectors, the effectors being controlled according to instructions in the system tables.

3. The robotic system of claim 1, further comprising a system processing component comprising system avionics for controlling the system, wherein the system processing component is a single system processing component provided for the plurality of robotic elements.

4. The robotic system of claim 3, wherein the system processing component is on one of the plurality of robotic elements.

5. The robotic system of claim 3, further comprising a system base station for housing the system processing component.

6. The robotic system of claim 1, wherein the virtual backplane is a deterministic wireless virtual backplane, wherein the data transfers between the deterministic wireless virtual backplane and the plurality of robotic elements occur at predetermined times according to the system tables.

7. The robotic system of claim 1, wherein data in the at least one memory component of one of the plurality of robotic elements is available to the other of the plurality of robotic elements via the virtual backplane.

8. The robotic system of claim 1, wherein at least one of the plurality of robotic elements include a partitioned operating system comprising a plurality of partitions, each partition being coupled to the virtual backplane.

9. The robotic system of claim 1, wherein the plurality of robotic elements are coordinated to perform a function.

10. The robotic system of claim 1, wherein the memory-includes toggle memory configured to select a current system table from the system tables-based upon the occurrence of a predefined event.

11. The robotic system of claim 10, wherein the predefined event is a change in the number of robotic elements.

12. The robotic system of claim 10, wherein the predefined event is the passage of an amount of time.

13. The robotic system of claim 10, wherein the predefined event is a change in software function.

14. The robotic system of claim 10, wherein the predefined event is an operator command.

15. The robotic system of claim 1, wherein the plurality of robotic elements include a first robotic element with a first at least one processing component and a second robotic element with a second at least one processing component, wherein the second at least one processing component provides redundant processing capability for the first at least one processing component.

* * * * *